US007000016B1

(12) United States Patent
Vanderbeck et al.

(10) Patent No.: US 7,000,016 B1
(45) Date of Patent: Feb. 14, 2006

(54) SYSTEM AND METHOD FOR MULTI-SITE CLUSTERING IN A NETWORK

(75) Inventors: Sunny C. Vanderbeck, Dallas, TX (US); William R. Zoltan, Dallas, TX (US)

(73) Assignee: Data Return LLC, Chicago, IL (US)

( * ) Notice: Subject to any disclaimer, the term of this patent is extended or adjusted under 35 U.S.C. 154(b) by 786 days.

(21) Appl. No.: 10/039,909

(22) Filed: Oct. 19, 2001

(51) Int. Cl.
*G06F 155/173* (2006.01)

(52) U.S. Cl. ............... 709/226; 709/203; 709/219; 709/229

(58) Field of Classification Search ............ 709/203, 709/219, 226, 229, 239, 242
See application file for complete search history.

(56) References Cited

U.S. PATENT DOCUMENTS

| | | | |
|---|---|---|---|
| 5,822,531 A | 10/1998 | Gorczyca et al. | 395/200.51 |
| 5,918,017 A | 6/1999 | Attanasio et al. | 395/200.54 |
| 5,938,732 A | 8/1999 | Lim et al. | 709/229 |
| 5,983,281 A | 11/1999 | Ogle et al. | 709/249 |
| 5,987,621 A | 11/1999 | Duso et al. | 714/4 |
| 5,996,086 A | 11/1999 | Delaney et al. | 714/4 |
| 6,003,075 A | 12/1999 | Arendt et al. | 709/221 |
| 6,006,259 A | 12/1999 | Adelman et al. | 709/223 |
| 6,012,150 A | 1/2000 | Bartfai et al. | 714/4 |
| 6,023,722 A | 2/2000 | Colyer | 709/201 |
| 6,070,191 A | 5/2000 | Narendran et al. | 709/226 |
| 6,078,943 A | 6/2000 | Yu | 709/105 |
| 6,078,957 A | 6/2000 | Adelman et al. | 709/224 |
| 6,078,960 A | 6/2000 | Ballard | 709/229 |
| 6,088,727 A | 7/2000 | Hosokawa et al. | 709/223 |
| 6,101,508 A | 8/2000 | Wolff | 707/218 |
| 6,119,143 A | 9/2000 | Dias et al. | 709/201 |
| 6,128,279 A | 10/2000 | O'Neil et al. | 370/229 |
| 6,128,644 A | 10/2000 | Nozaki | 709/203 |
| 6,151,688 A | 11/2000 | Wipfel et al. | 714/48 |
| 6,175,869 B1 | 1/2001 | Ahuja et al. | 709/226 |
| 6,178,160 B1 | 1/2001 | Bolton et al. | 370/255 |
| 6,182,139 B1 | 1/2001 | Brendel | 709/226 |
| 6,185,601 B1 | 2/2001 | Wolff | 709/203 |
| 6,185,619 B1 | 2/2001 | Joffe et al. | 709/229 |
| 6,185,695 B1 | 2/2001 | Murphy et al. | 714/4 |
| 6,470,389 B1 * | 10/2002 | Chung et al. | 709/227 |
| 6,779,017 B1 * | 8/2004 | Lamberton et al. | 709/203 |
| 6,807,257 B1 * | 10/2004 | Kurganov | 379/88.22 |
| 2001/0051975 A1 * | 12/2001 | Ohtani et al. | 709/202 |
| 2002/0152279 A1 * | 10/2002 | Sollenberger et al. | 709/217 |

* cited by examiner

*Primary Examiner*—Gertrude A. Jeanglaude
(74) *Attorney, Agent, or Firm*—Bell Boyd & Lloyd LLC

(57) ABSTRACT

A method for multi-site clustering in a network includes receiving a domain name from a client at a first domain name server, and identifying a first network address and a second network address associated with the domain name. The first network address is associated with a first site that includes a load balancer coupled to a plurality of web servers, and the second network address is associated with a second site that includes a second domain name server. The method also includes determining whether the first site is available to serve the client, and determining whether the second site is available to serve the client. The method further includes communicating the first network address followed by the second network address to the client based at least partially on a determination that the first site and the second site are available, and communicating the second network address to the client based at least partially on a determination that the first site is not available.

56 Claims, 5 Drawing Sheets

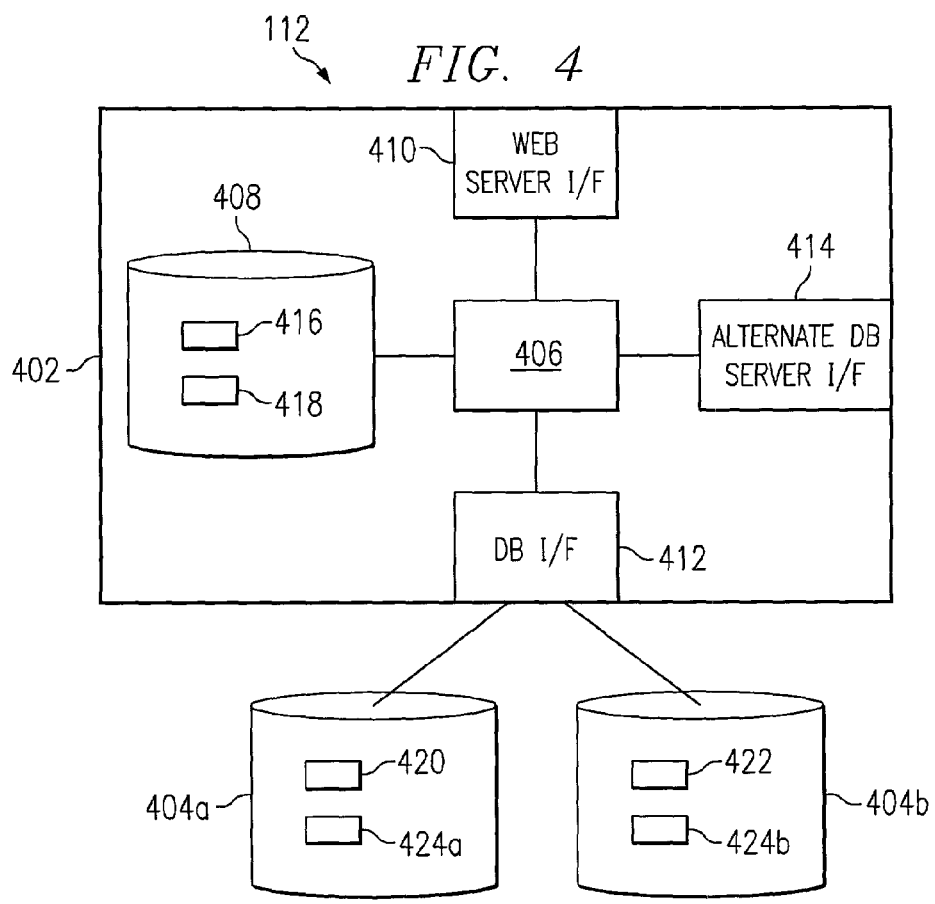
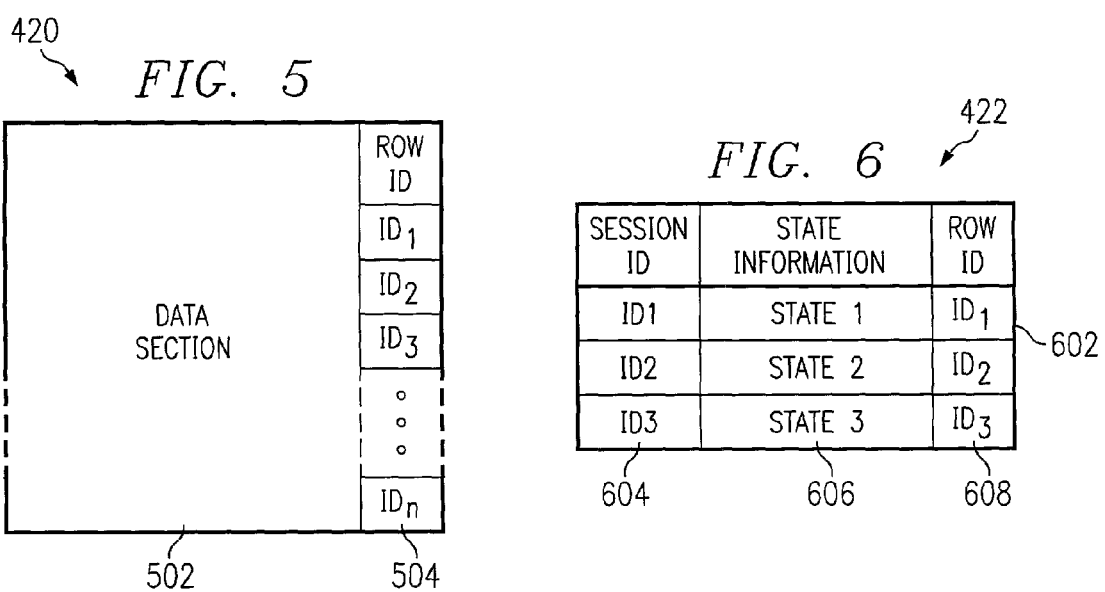

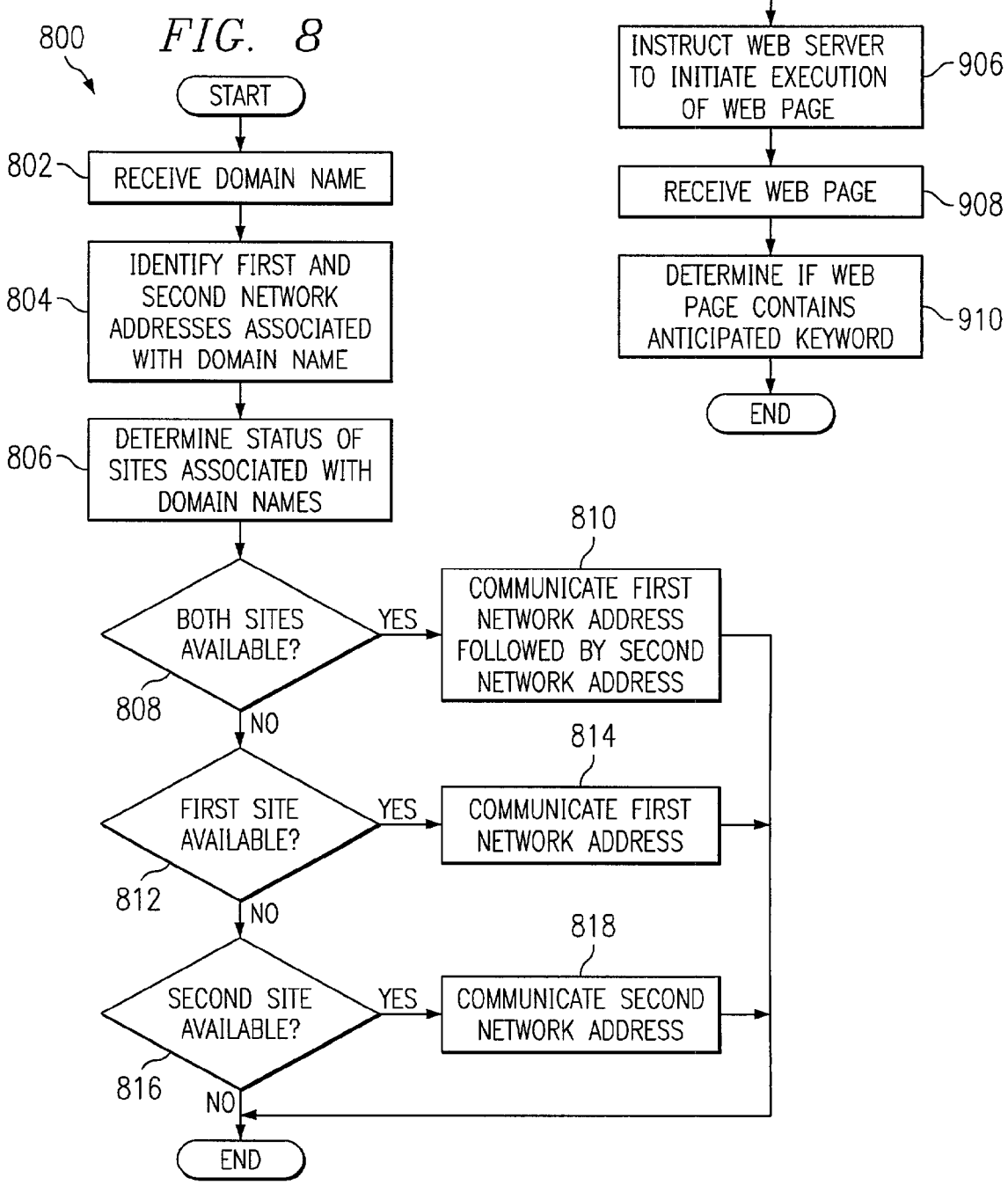

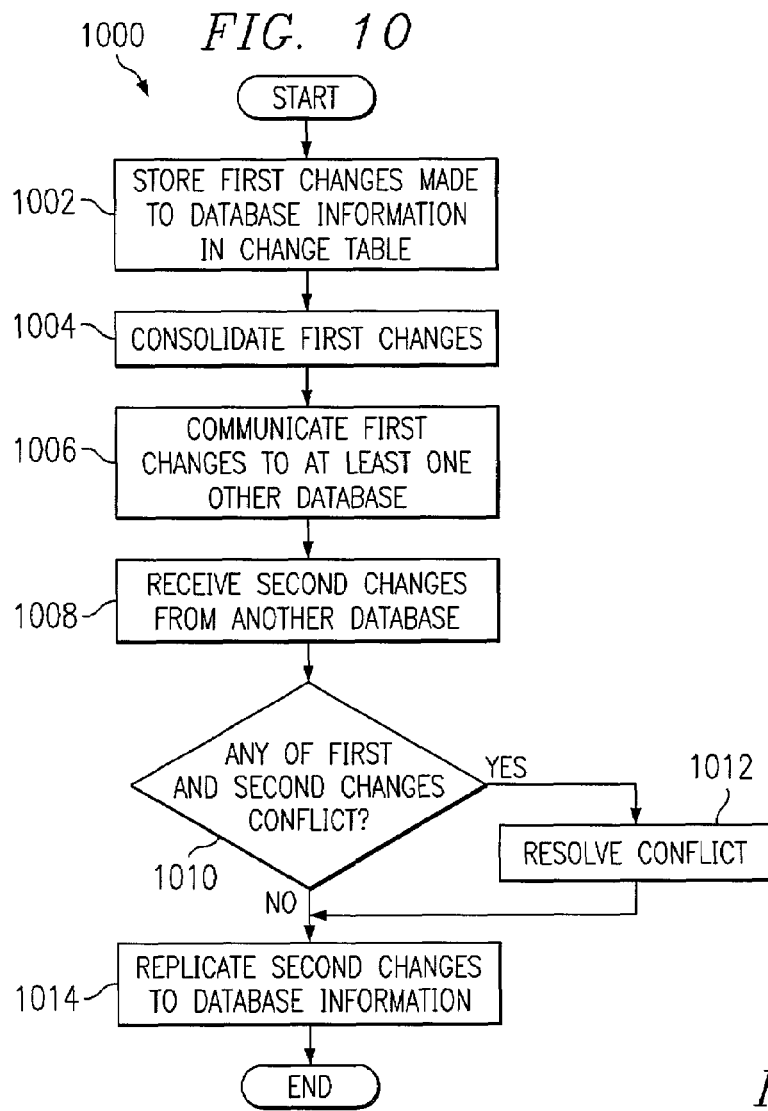
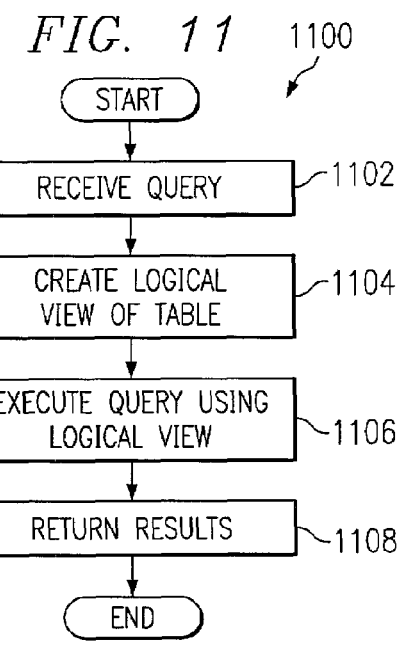

SYSTEM AND METHOD FOR MULTI-SITE CLUSTERING IN A NETWORK

CROSS-REFERENCE TO RELATED APPLICATIONS

This application is related to U.S. application Ser. No. 10/042,034 filed Oct. 19, 2001 by Zoltan et al. for a "System and Method for Accessing Information in a Replicated Database."

TECHNICAL FIELD

This invention relates generally to the field of communication systems, and more particularly to a system and method for multi-site clustering in a network.

BACKGROUND

In a typical network, a domain name server (DNS) is responsible for translating domain names into network addresses. The domain name server may receive a domain name from a client, access a database, and locate the domain name. The domain name server may then identify the network address, such as an Internet Protocol (IP) address, associated with the domain name and communicate that network address to the browser. For example, a domain name server may receive a domain name such as "www.datareturn.com" from a browser. The domain name server may access the database, determine that this domain name corresponds to an IP address of "216.46.236.253," and communicate that IP address to the client that submitted the domain name to the domain name server. The browser may then use that network address to communicate with a server at that network address.

SUMMARY

In accordance with the present invention, a system and method for multi-site clustering in a network are provided that substantially eliminate or reduce disadvantages and problems associated with conventional systems.

In one embodiment of the invention, a system for multi-site clustering in a network includes a memory operable to store a first network address and a second network address associated with a domain name. The system also includes at least one processor operable to receive the domain name from a client, and identify the first network address and the second network address associated with the domain name. The first network address is associated with a first site that includes a load balancer coupled to a plurality of web servers, and the second network address is associated with a second site that includes a domain name server. The processor is also operable to determine whether the first site is available to serve the client, and determine whether the second site is available to serve the client. The processor is further operable to communicate the first network address followed by the second network address to the client based at least partially on a determination that the first site and the second site are available, and communicate the second network address to the client based at least partially on a determination that the first site is not available.

Numerous technical advantages are provided according to various embodiments of the present invention. Particular embodiments of the invention may exhibit none, some, or all of the following advantages depending on the implementation. For example, in one embodiment, a system for multi-site clustering in a network is provided. In a particular embodiment, a domain name may be associated with multiple network addresses in the network, and a domain name server may be associated with each network address. The domain name server may monitor the web servers, load balancers, databases, and/or other components associated with the network address. A domain name server associated with one network address may also monitor the status of the domain name server associated with the other network address. When a client submits a request to one of the domain name servers for the network address of the domain name, the domain name server may communicate one, both, or none of the network addresses to the client, depending on the status of the components in the network. In one embodiment, the domain name servers may direct all client traffic towards one of the network addresses until that network address becomes unavailable. For example, the network address may become unavailable because the database associated with that network address fails. After that, the domain name servers may direct all client traffic towards the other network address. This allows the domain name servers to direct clients to a first network address when the components serving that network address are available, and then redirect clients to a second network address when the first network address becomes unavailable. This may help to ensure that the domain name servers direct clients to a working network address.

Another advantage of at least some embodiments of the invention is that changes to the information in one database associated with one of the network addresses may be replicated in a database associated with another network address. In one embodiment, changes to each of the databases may be monitored, and the changes in each database may be replicated in the other database. In a particular embodiment, changes may be replicated in the databases more continuously and with lower latency than conventional systems. This helps to increase the speed at which the database replication occurs. This also helps to ensure that clients have access to the same information, even when the clients are communicating with different network addresses.

In addition, state information associated with a client connection may be maintained in the system. The state information may, for example, represent the current status of a transaction that is occurring between the client and a web server. In one embodiment, the state information may be stored in the client computer. In another embodiment, the web servers may store the state information in the databases, and the state information may be synchronized in the different databases in the network. If the network address used by a client becomes unavailable, the client may be able to use another network address without being forced to reinitiate the transaction. This helps to ensure that the state information for a client may be maintained when one of the network addresses becomes unavailable.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which:

FIG. 4 is a block diagram illustrating an example database;

FIG. 5 is a block diagram illustrating an example data table;

FIG. 6 is a block diagram illustrating an example state information table;

FIG. 7 is a block diagram illustrating an example change table;

FIG. 8 is a flow diagram illustrating an example method for multi-site clustering in a network;

FIG. 9 is a flow diagram illustrating an example method for determining the status of components of a network site;

FIG. 10 is a flow diagram illustrating an example method for database replication in a network;

FIG. 11 is a flow diagram illustrating an example method for accessing information in a replicated database.

DETAILED DESCRIPTION OF EXAMPLE EMBODIMENTS

Figure 1:
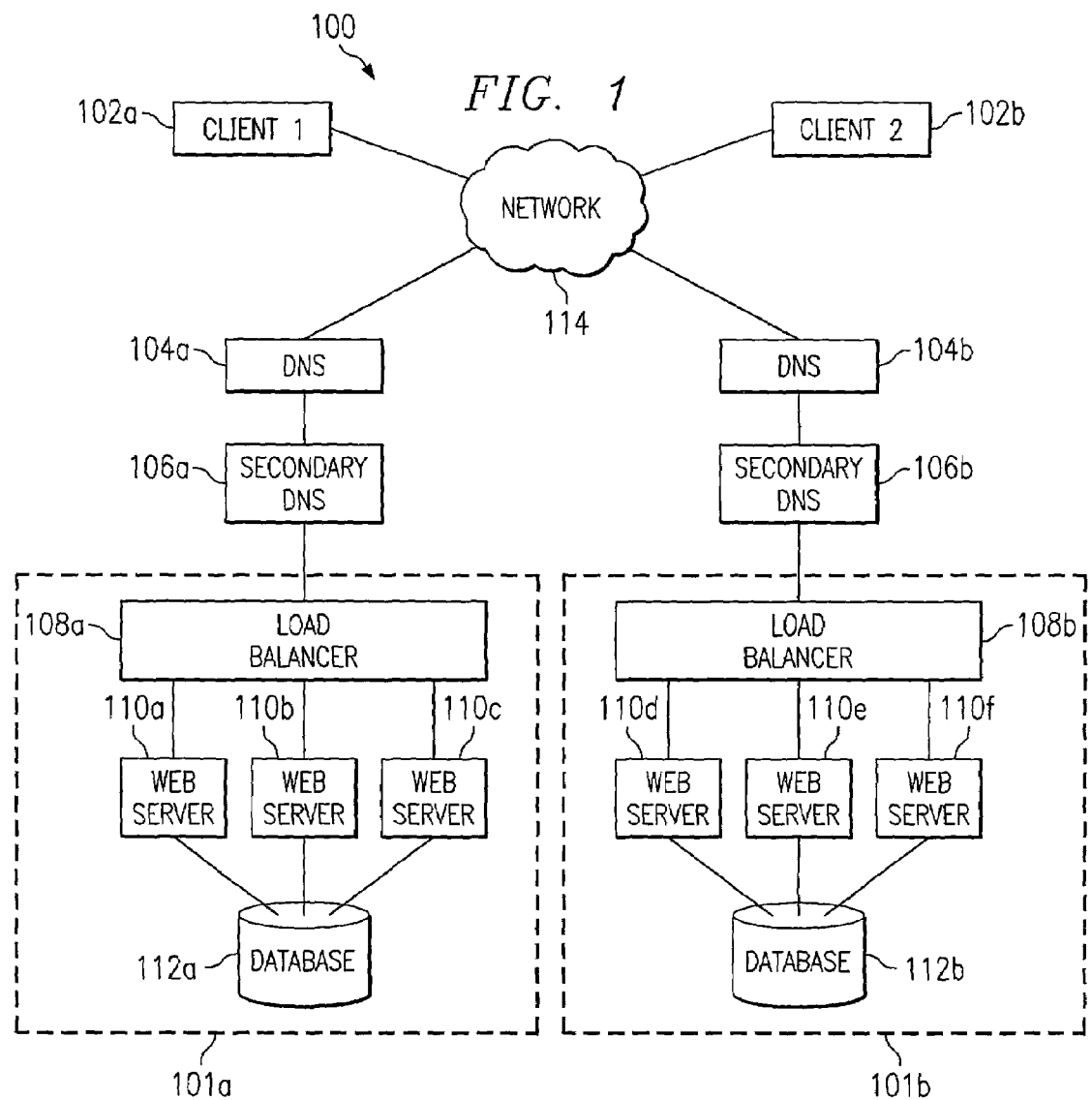
FIG. 1 is a block diagram illustrating an example system for multi-site clustering in a network.

FIG. 1 is a block diagram illustrating an example system 100 for multi-site clustering in a network. In the illustrated embodiment, system 100 includes clients 102, domain name servers (DNS) 104, secondary domain name servers 106, load balancers 108, web servers 110, and databases 112. Other embodiments of system 100 may be used without departing from the scope of the present invention.

In one aspect of operation, a domain name may be associated with multiple network addresses in network 114. Each network address may correspond to a different site 101 in system 100. When a client 102 attempts to communicate using a domain name, the domain name server 104 and/or secondary domain name server 106 may communicate one, multiple, or none of the network addresses to client 102. For example, in a particular embodiment, a secondary domain name server 106a may monitor the status of another secondary domain name server 106b and the status of the components of a site 101a. The secondary domain name server 106a may then communicate one, both, or neither network address to client 102, depending on the status of the other secondary domain name server 106b and the status of the components in site 101a. For example, if the components of the site 101a and the other secondary domain name server 106b are operational and able to serve clients 102, secondary domain name server 106a may communicate both network addresses to client 102. If site 101a is unable to serve clients 102 because one or more components are unavailable, secondary domain name server 106a may communicate the network address of site 101b to client 102. This allows secondary domain name servers 106 to direct clients 102 to a first site 101a when the components serving that site 101a are available, and then redirect clients 102 to a second site 101b when the first site 101a becomes unavailable. This helps to ensure that secondary domain name servers 106 direct clients 102 to a working network address in network 114.

In another aspect of operation, changes to the data in one database 112 may be replicated in the other database 112, which helps to ensure that clients 102 have access to the same data no matter which site 101 the clients 102 are accessing. The information replicated may include state information associated with clients 102, which helps to ensure that the state information for a client 102 may be maintained when one of the sites 101 becomes unavailable.

In yet another aspect of operation, in one embodiment, the information stored in databases 112 is associated with identifiers, such as row identifiers, to facilitate database synchronization. In this embodiment, a database 112 may use logical structures to extract information from the database 112 without extracting the row identifiers. The extracted information may then be provided to users or applications, such as applications executed by web servers 110. This reduces the likelihood that the row identifiers will be processed by web servers 110 and/or shown to clients 102. This also reduces the need to rewrite the applications executed by web servers 110 to filter out or otherwise ignore the row identifiers.

Client 102 is coupled to network 114. In this document, the term "couple" refers to any direct or indirect communication between two or more elements in system 100, whether or not those elements are in physical contact with one another. Client 102 may communicate over network 114. For example, client 102 may communicate information to and/or receive information from various servers and other computing devices coupled to network 114. In one embodiment, client 102 may communicate with the computing devices in network 114 using domain names. For example, client 102 may submit a domain name to a domain name server 104 and receive one or more network addresses associated with the domain name. In one embodiment, a network address represents the Internet Protocol (IP) address of a computing device in network 114, although any other suitable network addresses may be used. Client 102 may use a network address to communicate with a server or other computing device at that network address. Client 102 may include any hardware, software, firmware, or combination thereof that facilitates communication over network 114. In one embodiment, client 102 may include a browser capable of displaying information to and collecting information from a user. In a particular embodiment, the browser may submit a domain name to domain name server 104 and receive multiple network addresses associated with the domain name. In this embodiment, the browser may attempt to communicate with a server or other computing device at the network address received first. If communication with that network address fails, such as when a connection cannot be established with the computing device or the attempt times out, the browser may attempt to communicate with a server or other computing device at the network address received second.

Domain name server 104 is coupled to network 114. Domain name server 104 may receive a domain name from a client 102 over network 114. Domain name server 104 may access a database, retrieve one or more network addresses associated with the domain name, and communicate the network addresses to client 102. Domain name server 104 may also determine that secondary domain name server 106 is responsible for identifying the network address or addresses associated with the domain name, and domain name server 104 may communicate the domain name to secondary domain name server 106. Domain name server 104 may include any hardware, software, firmware, or combination thereof that receives domain names and identifies associated network addresses.

In one embodiment, one of the domain name servers 104 acts as a primary domain name server. In this embodiment, clients 102 may first attempt to communicate with the primary domain name server 104. Clients 102 may attempt to communicate with another domain name server 104 if communication with the primary domain name server 104 fails. Other arrangements may be used in system 100 without departing from the scope of the present invention.

Secondary domain name server 106 is coupled to domain name server 104 and load balancer 108. Secondary domain name server 106 may also be coupled to network 114. Secondary domain name server 106 may receive a domain name from domain name server 104 and determine which network address or addresses, if any, to communicate to client 102. For example, if load balancer 108*a* is available to serve a client 102, secondary domain name server 106*a* may communicate the network address of load balancer 108*a* to client 102. If another secondary domain name server 106*b* is also available, secondary domain name server 106*a* may communicate the network address of secondary domain name server 106*b* to client 102. Client 102 may use the network addresses to communicate with one or both of load balancer 108*a* and secondary domain name server 106*b*. In another embodiment, the network addresses communicated to client 102 may represent a virtual IP (VIP) address associated with a site 101. If load balancer 108, at least one web server 110, and database 112 in a site 101 are available, the VIP address associated with that site 101 is communicated to client 102. Client 102 may then attempt to access one of the web servers 110 in one of the sites 101 using a VIP address. Client 102 may be directed to the load balancer 108 associated with that site 101, which would direct client 102 to one of the web servers 110. Although the following descriptions may describe secondary domain name server 106 communicating the network address of a load balancer 108 and/or another secondary domain name server 106 to a client 102, secondary domain name server 106 could also communicate the VIP address associated with an available site 101 to client 102 without departing from the scope of the present invention.

Secondary domain name servers 106 may determine which network addresses to communicate to clients 102 using any suitable criteria. In one embodiment, the address or addresses communicated to client 102 by a secondary domain name server 106 depend, at least in part, on the status of the components in a site 101. As particular examples, secondary domain name server 106 may communicate the network address of a load balancer 108 to client 102 when load balancer 108, at least one web server 110, and database 112 in a site 101 are available. If load balancer 108, web servers 110, and/or database 112 become unavailable, secondary domain name server 106 may determine that the network address associated with that site 101 should not be communicated to client 102. One secondary domain name server 106*a* may also communicate the network address of another secondary domain name server 106*b* to client 102 when the other secondary domain name server 106*b* is available. For example, each secondary domain name server 106 may communicate a signal to the other secondary domain name server 106 during regular intervals. These signals allow each secondary domain name server 106 to determine whether the other secondary domain name server 106 is available. If one secondary domain name server 106 becomes unavailable, the network address associated with the unavailable secondary domain name server 106 may not be communicated to client 102. In this document, the term "unavailable" refers to the inability of a component in system 100 to communicate with, establish a connection with, and/or maintain a connection with a client 102. A component may be unavailable due to power failure, failure of a hardware subsystem, software errors, communication link breakdowns, or any other condition or conditions that interrupt service. Also, the term "available" refers to the ability of a component in system 100 to communicate with, establish a connection with, and/or maintain a connection with a client 102.

In addition to using the availability of the components in a site 101, secondary domain name server 106 may identify the network address or addresses to communicate to a client 102 using the load placed on each site 101, the response time of each site 101, the locality of client 102 to a site 101, and/or any other suitable factors. Secondary domain name server 106 may determine which network address should be supplied first to a client 102 and which network address should be supplied second to client 102 by evaluating the various operational and other characteristics of each site 101. For example, secondary domain name server 106 could execute a function that evaluates the different characteristics.

The order of the network addresses communicated to client 102 may determine the order in which client 102 uses the network addresses. For example, in one embodiment, client 102 attempts to communicate with the first network address received from secondary domain name server 106. If communication with the first network address fails at some point during a session, client 102 may then attempt to communicate with the second network address. In a particular embodiment, secondary domain name servers 106 direct all clients 102 to a network address associated with one site 101. If and when that site 101 becomes unavailable, such as due to the unavailability of load balancer 108, web servers 110, and/or database 112, secondary domain name servers 106 may then direct all clients 102 to another site 101. Other methodologies may be used without departing from the scope of the present invention. For example, secondary domain name servers 106 could direct a portion of clients 102 to one site 101 and a portion of clients 101 to another site 101. In a particular embodiment, secondary domain name servers 106 use a round-robin approach to direct half of clients 102 to one site 101 and half of clients 102 to another site 101. Secondary domain name servers 106 could also use the load placed on each site 101, the response time of each site 101, the locality of client 102 to a site 101, and/or any other suitable factors to determine where to direct client 102.

Figure 2:
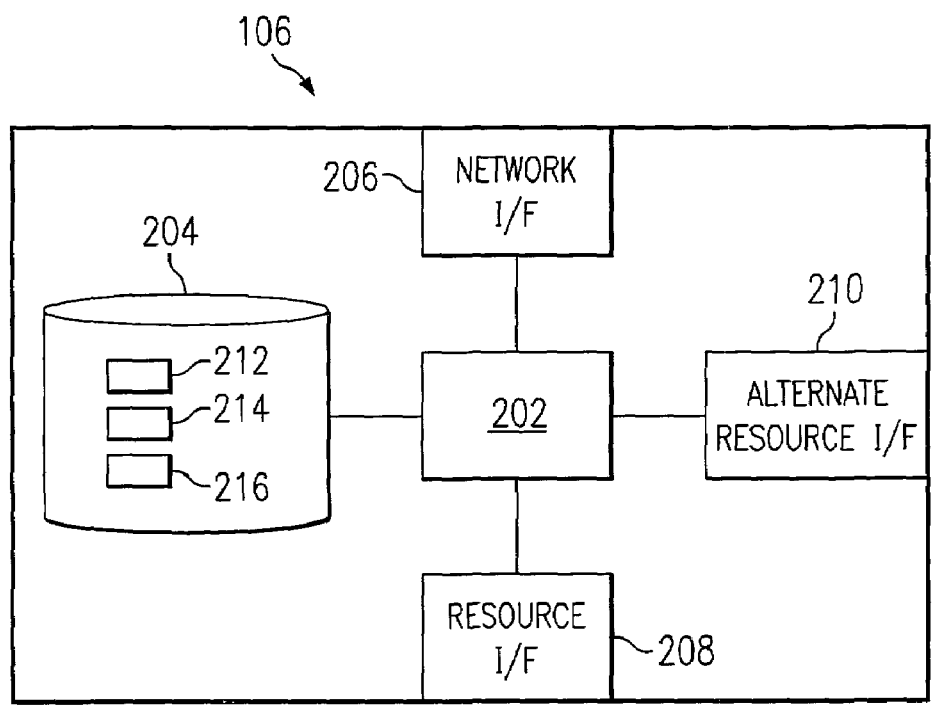
FIG. 2 is a block diagram illustrating an example domain name server.

Secondary domain name servers 106 may include any hardware, software, firmware, or combination thereof capable of receiving domain names and identifying associated network addresses. One example embodiment of a secondary domain name server 106 is shown in FIG. 2, which is described below. Although FIG. 1 illustrates domain name server 104 and secondary domain name server 106 as separate components in system 100, domain name server 104 and secondary domain name server 106 may be combined into a single domain name server. In this document, the phrase "domain name server" may refer to domain name server 104, secondary domain name server 106, a combination of domain name server 104 and secondary domain name server 106, and/or any other suitable domain name server.

Figure 3:
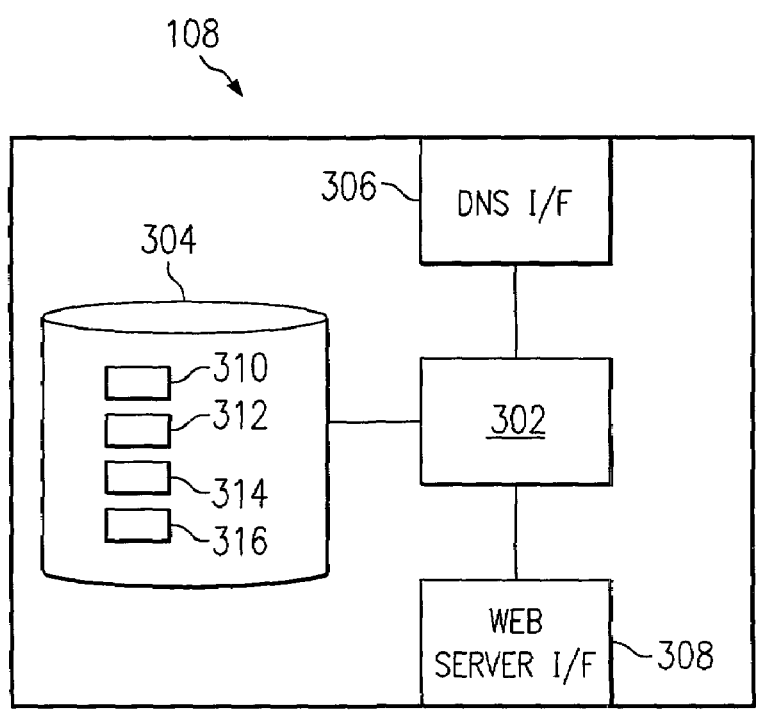
FIG. 3 is a block diagram illustrating an example load balancer.

Load balancer 108 is coupled to secondary domain name server 106 and two or more web servers 110. Load balancer 108 may also be coupled to network 114. Load balancer 108 may receive a request from client 102 to access a web site served by at least one of the web servers 110. If multiple web servers 110 serve the requested web site, load balancer 108 directs the client 102 to one of the web servers 110. For example, load balancer 108 may direct a client 102 to the web server 110 serving the least number of clients 102. Load balancer 108 could also use a round-robin approach to directing clients 102 to web servers 110. In this manner, load balancer 102 helps to distribute clients 102 to different web servers 110, which helps to reduce the likelihood that an excessive number of clients 102 will be assigned to one web server 110. Load balancer 108 may also monitor the status of the web servers 110 and/or database 112 in a site 101. For example, load balancer 108 may determine whether any web servers 110 are available to serve a client 102 and whether web servers 110 may access database 112. If no web servers 110 are available and/or web servers 110 cannot access database 112, load balancer 108 may inform secondary domain name server 106 that site 101 may not serve clients 102. Secondary domain name server 106 may then take any suitable actions, such as no longer communicating the network address of load balancer 108 to clients 102. Load balancer 108 may include any hardware, software, firmware, or combination thereof capable of distributing clients 102 across multiple web servers 110. One example embodiment of a load balancer 108 is shown in FIG. 3, which is described below.

Web server 110 is coupled to load balancer 108 and database 112. Web server 110 may also be coupled to network 114. Web server 110 delivers information to and receives information from clients 102. For example, web server 110 may communicate content such as web pages containing information from database 112 to client 102 over network 114. Client 102 may also communicate information to web server 110, such as information identifying a product that a user operating client 102 wishes to purchase. Web server 110 may also execute applications to perform different functions for or on behalf of clients 102. For example, web server 110 may execute an application that allows web server 110 to verify credit card information supplied by a user using client 102. In addition, web server 110 may store information in and retrieve information from database 112. For example, in one embodiment, web server 110 may store state information associated with a communication session with a client 102 in database 112. The state information could, for example, identify the applications being executed for client 102, the network address of client 102, the length of a session, and the web site being viewed by client 102. Web server 110 may include any hardware, software, firmware, or combination thereof capable of communicating with and delivering content to clients 102.

In one embodiment, web servers 110 may also communicate with other web servers 110 to help ensure that changes to the web pages in one web server 110 are replicated to the web pages in other web servers 110. For example, if a web page in one web server 110 is updated, that web server 110 may communicate with the other web servers 110 within that site 101 to update those web servers 110. An updated web server 110 in one site may also communicate with the web servers 110 in another site 101 to update those web servers 110. Web servers 110 may communicate with other web servers 110 using any suitable method and at any suitable interval. For example, web servers 110 may communicate with one another at predetermined intervals or after a change has been made to one of the web pages in a web server 110.

Database 112 is coupled to web servers 110. In one embodiment, database 112 stores information used by web servers 110 to provide service to clients 102. Database 112 may store any suitable information. For example, database 112 may store information identifying products sold by a business that uses web servers 110. Database 112 could also store information identifying customers of the business. In addition, database 112 could store state information identi-fying the status of a communication session with a client 102. Any other suitable information could be stored in database 112 without departing from the scope of the present invention. In addition, databases 112 may communicate with one another to help ensure that changes to the information in one database are replicated in another database 112. For example, if information in database 112a is stored in a table and three rows of the table are deleted, the same three rows in the same table in database 112b may also be deleted. Each database 112 monitors the changes made to the information stored in database 112 and communicates the changes to the other database 112, thereby replicating the changes in the other database 112. One example method for database replication is illustrated in FIG. 10, which is described below. Database 112 may include any hardware, software, firmware, or combination thereof for storing and facilitating retrieval of information. Database 112 may reside at any suitable location that is accessible to web servers 110. One example of database 112 is shown in FIG. 4, which is described below.

In one embodiment, at least a portion of the information in database 112 may be stored in tables, and each row in the tables in database 112 may be assigned or otherwise associated with a row identifier to facilitate database synchronization. In a particular embodiment, each row identifier uniquely identifies a row in a database 112. When a change is made to an entry in a row in database 112, the changed entry in the row or the entire row may be copied to a table used to track changes to database 112. An agent, such as a software program, in one database 112 may access the table and communicate the changes to another database 112. An agent in the other database 112 may receive the information and make similar changes in the other database 112. This allows changes in one database 112 to be replicated in another database 112. While information in database 112 has been described as residing in tables, any other suitable data structures, compilations, or arrangements may be used to store the information contained in database 112. Also, while database 112 has been described as using row identifiers to track changes made to the information, any other suitable identifiers, such as column identifiers, may be used without departing from the scope of the present invention.

Network 114 is coupled to client 102 and one or more components of sites 101. Network 114 facilitates communication between different components coupled to network 114. For example, network 114 may transport packets of information between client 102 and web server 110. Network 114 may include any hardware, software, firmware, or combination thereof for transporting circuit-switched, packet-switched, and/or other information. Network 114 may, for example, include a Local Area Network (LAN), a Wide Area Network (WAN), a Metropolitan Area Network (MAN), a portion of a global computer network such as the Internet, or any other communication system or systems at one or more locations.

Although FIG. 1 illustrates one example embodiment of system 100, various changes may be made to system 100 without departing from the scope of the present invention. For example, any suitable number of sites 101 may be present in system 100, and a site 101 may include any number of load balancers 108, web servers 110, and/or databases 112. Also, any number of domain name servers 104 and 106 may be present in system 100. Further, domain name server 104 and secondary domain name server 106 may be combined, and/or additional domain name servers may be used in conjunction with domain name server 104 and secondary domain name server 106. In addition, while FIG. 1 illustrates a single database 112 in each site 101, each site 101 could include multiple databases 112. For example, each site 101 could have a primary database 112 and a backup or redundant database 112.

FIG. 2 is a block diagram illustrating an example domain name server 106. In the illustrated embodiment, domain name server 106 includes at least one processor 202, a memory 204, a network interface 206, a resource interface 208, and an alternate resource interface 210. Other embodiments of domain name server 106 may be used without departing from the scope of the present invention. Although FIG. 2 may be described as representing domain name server 106, the same or similar components may be used in domain name server 104 or any other suitable domain name server.

Processor 202 is coupled to memory 204, network interface 206, resource interface 208, and alternate resource interface 210. Processor 202 executes instructions and manipulates data to provide one or more network addresses associated with sites 101 to clients 102. For example, processor 202 may monitor the status of load balancer 108, web servers 110, and database 112 in the site 101 associated with domain name server 106. Processor 202 may also monitor the status of another domain name server 106. Based on the status of these and/or other components in system 100, processor 202 may communicate the network address of load balancer 108 and/or the network address of the other domain name server 106 to a client 102. Processor 202 may be any processor or processors suitable for performing domain name-network address translation functions. Although FIG. 2 illustrates a single processor 202, multiple processors 202 may be used according to particular needs.

Memory 204 is coupled to processor 204. Memory 204 stores and facilitates retrieval of information used by processor 202 to provide one or more network addresses associated with a domain name to clients 102. For example, memory 204 may store network address information 212, which associates at least one domain name with at least one network address. As a particular example, network address information 212 may associate a domain name with a network address of a load balancer 108 in one site 101 and with a network address of another secondary domain name server 106 serving a second site 101. Memory 204 could also store status information 214 representing the status of one or more components of system 100. For example, status information 214 may identify the status of load balancer 108, web servers 110, and database 112 in one site 101 and the status of another domain name server 106 serving a second site 101. As a particular example, status information 214 may identify whether load balancer 108, web servers 110, and database 112 in one site 101 and another domain name server 106 serving a second site 101 are available. As another example, status information 214 may identify the load placed on each site 101, the response time of each site 101, the location of each site 101, and/or any other suitable information. Memory 204 may include any hardware, software, firmware, or combination thereof for storing and facilitating retrieval of information. Although FIG. 2 illustrates memory 204 as residing within domain name server 106, memory 204 may reside in any location or locations accessible by domain name server 106.

Network interface 206, resource interface 208, and alternate resource interface 210 are each coupled to processor 202. Interfaces 206–210 facilitate communication between domain name server 106 and other components of system 100. For example, network interface 206 may facilitate communication with clients 102 over network 114. Resource interface 208 may facilitate communication with a load balancer 108 in a site 101 served by domain name server 106. Alternate resource interface 210 may facilitate communication with another domain name server 106. Interfaces 206–210 each may include any hardware, software, firmware, or combination thereof capable of communicating with other components in system 100. Although FIG. 2 illustrates three separate interfaces 206–210, various interfaces 206–210 may be combined without departing from the scope of the present invention.

In one aspect of operation, processor 202 receives a domain name from a client 102 through network interface 206. Processor 202 may access network address information 212 and identify the network address or addresses associated with the domain name. Processor 202 may also access status information 214 and determine if any of the identified network addresses are unavailable. If both network addresses may be used by client 102, processor 202 may communicate the addresses to client 102 using network interface 206. If only one network address may be used, processor 202 communicates that network address to client 102.

Processor 202 may monitor the status of load balancer 108, web servers 110, and database 112 associated with one site 101 and the status of another domain name server 106 associated with another site 101 using any suitable method. In this document, the term "monitor" refers to both actively monitoring a component and passively receiving information identifying a component's status. For example, domain name server 106 may actively determine whether components of system 100, such as load balancer 108, web servers 110, database 112, and/or another domain name server 106, are available by executing diagnostics tests, instructing the component to perform certain activities, and/or actively communicating with a component and receiving a response. Domain name server 106 could also passively receive information identifying the status of the components in system 100. As a particular example, domain name server 106 could communicate with sites 101 and measure the load placed on each site 101 and the response time of each site 101 using any suitable method.

In a particular embodiment, load balancer 108 monitors the status of the web servers 110 and database 112 in a site 101. If the web servers 110 and/or the database 112 become unavailable, load balancer 108 may inform domain name server 106 through resource interface 208 that the network address associated with load balancer 108 is unavailable and/or that web servers 110 or database 112 are unavailable. Also, if processor 202 cannot communicate with load balancer 108 through resource interface 208, processor 202 may determine that load balancer 108 is unavailable. In either case, processor 202 may update status information 214 to reflect that the network address associated with load balancer 108 is unavailable.

Processor 202 could also monitor the status of another domain name server 106 using alternate resource interface 210. For example, in one embodiment, processor 202 may communicate a message to another domain name server 106 and receive messages from that domain name server. As a particular example, processor 202 in domain name server 106a may communicate messages, called "pings," to another domain name server 106b through alternate resource interface 210. Similarly, domain name server 106b may communicate pings to domain name server 106a, and processor 202 may receive the messages through alternate resource interface 210. Processor 202 may determine the status of domain name server 106b based on the presence or absence of the ping messages received through alternate resource 210. For example, if processor 202 fails to receive pings from domain name server 106b for five seconds, processor 202 may determine that domain name server 106b is unavailable. Processor 202 may communicate ping messages to another domain name server 106 under the control of a pinging application 216. In another embodiment, another component in domain name server 106 may communicate messages to another domain name server 106, rather than processor 202. For example, a hardware component of domain name server 106 may be configured to repeatedly communicate a message through alternate resource interface 210.

Although FIG. 2 illustrates one example embodiment of a domain name server 106, various changes may be made to domain name server 106 without departing from the scope of the present invention. For example, any suitable number of processors 202, memories 204, and/or interfaces may be used in domain name server 106. Also, the functions of domain name server 106 may be implemented using any hardware, software, firmware, or combination thereof. As a particular example, the functions may be implemented by software instructions stored in any suitable device, such as a random access memory (RAM), a read-only memory (ROM), an application-specific integrated circuit (ASIC), or a field programmable gate array (FPGA).

FIG. 3 is a block diagram illustrating an example load balancer 108. In the illustrated embodiment, load balancer 108 includes at least one processor 302, a memory 304, a domain name server interface 306, and a web server interface 308. Other embodiments of load balancer 108 may be used without departing from the scope of the present invention.

Processor 302 is coupled to memory 304, domain name server interface 306, and web server interface 308. Processor 302 executes instructions and manipulates data to perform load balancing functions within a site 101 in system 100. For example, processor 302 may receive an indication from secondary domain name server 106 and/or client 102 that client 102 is attempting to access a web site associated with site 101. Processor 302 may also determine which web server 110 should communicate with and provide services to client 102. Processor 302 may further communicate the network address of the selected web server 110 to client 102 and/or instruct the selected web server 110 to communicate with client 102. In addition, processor 302 may monitor the status of web servers 110 and/or database 112. If the web servers 110 and/or the database 112 in a site 101 served by load balancer 108 become unavailable, load balancer 108 may notify client 102, domain name server 104, secondary domain name server 106, and/or any other suitable component in system 100 that clients 102 may not be able to communicate with and receive service from site 101. In a particular embodiment, load balancer 108 notifies secondary domain name server 106 that the network address associated with a site 101 is unavailable when all web servers 110 in site 101 are unavailable and/or the database 112 in site 101 is unavailable. Secondary domain name server 106 may then take any suitable action, such as no longer communicating the network address of the unavailable site 101 to clients 102. Processor 302 may be any processor or processors suitable for performing load balancing functions in system 100. Although FIG. 3 illustrates a single processor 302, multiple processors 302 may be used according to particular needs.

Memory 304 is coupled to processor 304. Memory 304 stores and facilitates retrieval of information used by processor 302 to perform load balancing functions. For example, memory 304 may store status information 310 representing the status of one or more components of site 101. As particular examples, status information 310 may identify the status of web servers 110 and/or database 112 in a site 101. Memory 304 may include any 10 hardware, software, firmware, or combination thereof for storing and facilitating retrieval of information. Although FIG. 3 illustrates memory 304 as residing within load balancer 108, memory 304 may reside in any location or locations accessible by load balancer 108.

Domain name server interface 306 and web server interface 308 are each coupled to processor 302. Interfaces 306 and 308 facilitate communication between load balancer 108 and other components of system 100. For example, domain name server interface 306 may facilitate communication with domain name server 104 and/or secondary domain name server 106. Web server interface 308 may facilitate communication with web servers 110 in a site 101. Interfaces 306 and 308 each may include any hardware, software, firmware, or combination thereof capable of communicating with other components in system 100. Although FIG. 3 illustrates two separate interfaces 306 and 308, interfaces 306 and 308 may be combined without departing from the scope of the present invention.

In one aspect of operation, processor 302 receives an indication from a client 102, domain name server 104, and/or secondary domain name server 106 that client 102 wishes to receive service from a web server 110 in a site 101. Processor 302 determines which web server 110, if any, should be used to provide service to client 102. For example, processor 302 may determine which web server 110 is serving the fewest number of clients 102. Processor 302 may also direct clients 102 to web servers 110 using a round-robin approach, such as when processor 302 directs every third client to the same web server 110. Other allocation approaches may be used without departing from the scope of the present invention. In determining which web server 110 should serve a client 102, processor 302 may access status information 310 and determine if any of the web servers 110 and/or databases 112 are unavailable. If the database 112 or the web servers 110 in a site 101 are unavailable, processor 302 may inform domain name server 104 and/or secondary domain name server 106 that the network address associated with site 101 is unavailable. If at least one of the web servers 110 is available, processor 302 may direct clients 102 to those web servers 110.

Processor 302 may monitor the status of web servers 110 and/or databases 112 in a site 101 using any suitable method. In a particular embodiment, processor 302 may determine which web servers 110 are available by communicating pings to web servers 110 and checking if web servers 110 respond to the pings. Based on the presence or absence of the responses to the pings, processor 302 may update status information 310. Processor 302 may communicate ping messages to web servers 110 under the control of a pinging application 312, although a hardware or other component in load balancer 108 and/or another component in system 100 may be configured to determine the status of web servers 110.

Processor 302 may also monitor the ability of a web server 110 to execute applications. For example, processor 302 may instruct a web server 110 to execute an application to determine whether any hardware has failed in the web server 110. The application executed by web server 110 may be an application that web server 110 executes to provide services for clients 102. The application could also be a test program that causes web server 110 to perform one or more functions, thereby allowing load balancer 108 to determine if web server 110 is functioning properly. Any other suitable applications or activities may be performed by web server 110 without departing from the scope of the present invention. Processor 302 may instruct web servers 110 to execute an application under the control of a web server test application 314, although a hardware or other component in load balancer 108 and/or another component in system 100 may be configured to initiate the execution of the application in web server 110.

In addition, processor 302 may determine the status of one or more databases 112 in a site 101. For example, processor 302 may instruct a web server 110 to execute a web page that uses information from the database 112. The execution of the web page causes web server 110 to attempt to access database 112 and retrieve the information needed in the page. Processor 302 may determine the status of database 112 based on the information contained in the web page received from web server 110. For example, in one embodiment, load balancer 108 instructs web server 110 to initiate execution of a web page, receives the executed web page, and looks for an expected keyword in the web page. As a particular example, web server 110 may execute a test web page that includes the name of the database server that serves database 112. Processor 302 may receive the web page from web server 110 and determine if the appropriate database server name is contained in the web page. If the incorrect server name is included in the web page, or if no name could be retrieved from database 112, processor 302 may determine that database 112 is unavailable and update status information 310. Processor 302 may instruct web server 110 to execute a web page to determine the status of database 112 under the control of a database test application 316, although a hardware or other component in load balancer 108 and/or another component in system 100 may be configured to initiate the execution of the web page in web server 110. In one embodiment, load balance 108 uses a round-robin approach to pick which web server 110 executes the web page that tests database 112. Load balancer 108 could also instruct each web server 110 to execute the same or a different web page that tests database 112. Load balancer 108 may use any other suitable approach without departing from the scope of the present invention.

Although FIG. 3 illustrates one example embodiment of a load balancer 108, various changes may be made to load balancer 108 without departing from the scope of the present invention. For example, any suitable number of processors 302, memories 304, and/or interfaces may be used in load balancer 108. Also, the functions of load balancer 108 may be implemented using any hardware, software, firmware, or combination thereof. As a particular example, the functions may be implemented by software instructions stored in any suitable device, such as a RAM, a ROM, an ASIC, or a FPGA.

FIG. 4 is a block diagram illustrating an example database 112. In the illustrated embodiment, database 112 includes a database server 402 and one or more data stores 404. Other embodiments of database 112 may be used without departing from the scope of the present invention.

In the illustrated embodiment, database server 402 includes at least one processor 406, at least one memory 408, a web server interface 410, a database interface 412, and an alternate database interface 414. Other embodiments of database server 402 may be used without departing from the scope of the present invention. Processor 406 is coupled to memory 408, web server interface 410, database interface 412, and alternate database interface 414. Processor 406 executes instructions and manipulates data to perform database functions in system 100. For example, processor 406 may receive a request to retrieve information from one or more data stores 404. Processor 406 may identify the location of the requested information and retrieve the information from the identified location in data store 404. Processor 406 may also receive requests to store new information and/or modify existing information in data stores 404. For example, processor 406 may receive a request to add an additional row of information into a table in data store 404 or a request to delete a row of information. Processor 406 may then access data store 404 and make the requested additions, modifications, and/or deletions. In addition, processor 406 may perform database replication functions in system 100. For example, processor 406 may track the additions, deletions, and/or other changes made to the information in data stores 404, and processor 406 may communicate these changes to the database server 402 in another database 112 in system 100. Similarly, processor 406 may receive changes made to the information in the other database 112 in system 100, and processor 406 may make the same changes to the information in data stores 404. Processor 406 may be any processor or processors suitable to perform database replication functions in system 100. Although FIG. 4 illustrates a single processor 406, multiple processors 406 may be used according to particular needs.

Memory 408 is coupled to processor 406. Memory 408 stores and facilitates retrieval of information used by processor 406 to perform database replication functions. For example, memory 408 may store a database replication agent 416. Database replication agent 416 may, for example, represent a software application executed by processor 406 to provide the database replication functions in database 112. As a particular example, database replication agent 416 may monitor the changes made to the information in data stores 404 and store the changes in one or more change tables 418. In one embodiment, the database replication agent 416 may access the change tables 418 and communicate the changes to another database 112. In a particular embodiment, the database replication agent 416 communicates the changes in the change tables 418 to another database 112 at regular intervals, such as every one or five seconds. While database replication has been described as occurring under the control of a database replication agent 416, any hardware, software, firmware, or combination thereof in server 402 and/or other component of system 100 may be used to perform database replication. Also, although FIG. 4 illustrates memory 408 as residing within server 402, memory 408 may reside in any location or locations accessible by server 402.

In one embodiment, the information contained in change tables 418 may be removed from change tables 418 when database server 402 communicates that information to another database 112 and receives an acknowledgment from that database 112. In this embodiment, the acknowledgment message indicates that the other database 112 successfully received the information in change tables 418, and the other database 112 may replicate those changes. If the other database 112 fails to acknowledge the communication of the information from change table 418, database server 402 may continue to store that information in change tables 418. As a result, change tables 418 act as a queue for the changes to the information in data stores 404. For example, if a first database 112 is unavailable, such as due to a power failure, a second database 112 may store the changes made to the information in its data stores 404 in change tables 418. If and when the first database 112 becomes available, such as when power is restored to the first database 112, the information in the first database 112 may be synchronized with the information in the second database 112 because the changes have been stored in change tables 418 in the second database 112.

Web server interface 410, database interface 412, and alternate database interface 414 are each coupled to processor 406. Interfaces 410–414 facilitate communication between server 402 and other components of system 100. For example, web server interface 410 may facilitate communication with web servers 110. Database interface 412 may facilitate communication with one or more data stores 404 in database 112. Alternate database interface 412 may facilitate communication with another database 112 in system 100. Interfaces 410–414 each may include any hardware, software, firmware, or combination thereof capable of communicating with other components in system 100. Although FIG. 4 illustrates three separate interfaces 410–414, various interfaces 410–414 may be combined without departing from the scope of the present invention.

Data stores 404 are coupled to database server 402. Data store 404 stores and facilitates retrieval of information used by database server 402. The information stored in data stores 404 may vary depending on the application. For example, data store 404 may include data tables 420 that store information identifying products sold by a business and customers of the business. Data stores 404 could also store state information tables 422 identifying the status of a communication session with a client 102. Any other suitable information could be stored in data store 404 without departing from the scope of the present invention. Each data store 404 may include any suitable data structures, compilations, and/or arrangements used to store information. While data stores 404 are illustrated as residing in database 112, data stores 404 may reside in any location or locations accessible by database server 402.

To facilitate the replication of changes to the information in data stores 404 across multiple databases 112, the various tables in data stores 404, such as tables 420 and 422, may each include identifiers that identify one or more entries in the tables. In one embodiment, each table includes a column of row identifiers that identify the rows in the tables. In a particular embodiment, each row identifier uniquely identifies a row of entries in database 112. When a modification is made to one or more entries in a row, all or a portion of the row may be copied to the change tables 418. For example, if a row is added to a table, processor 406 may generate a new row identifier for that row, and the entries in the new row and the row identifier may be copied to a change table 418. If an entry in a row is modified, the entire row or a portion of the row, such as the changed entry, may be stored in a change table 418 along with the row identifier associated with that row. If a row is deleted, the row identifier and an indication that the row has been deleted may be stored in a change table 418. Database replication agent 416 may then communicate the information in change tables 418 to another database 112, which allows the other database 112 to replicate the same changes in its data stores 404. Similarly, database replication agent 416 may receive changes from another database 112 and replicate the same changes in data stores 404. While data stores 404 have been described as using row identifiers to track changes made to information, any other suitable identifiers, such as column identifiers, may be used without departing from the scope of the present invention.

In one embodiment, the presence of the row identifiers in the database tables 420 and 422 may create difficulties with the applications that use the information in database 112, such as the applications executed by web servers 110. For example, the row identifiers increase the number of columns in tables 420 and 422. An application that attempts to access table 420 and/or table 422 may not be configured to access a table having one extra column. Also, an application may be configured to retrieve all information from a table 420 or 422, so the application would retrieve the row identifiers as well as the remainder of the information contained in the table. As a result, the presence of the row identifiers could interfere with the applications retrieving the information from database 112.

To reduce the likelihood that an application retrieves the row identifiers from a database 112, database server 402 may create a logical structure 424, which is used to retrieve information from a table 420 or 422. For example, logical structure 424*a* may be associated with a table 420, and logical structure 424*b* may be associated with a table 422. When an application in web server 110 submits a query to database server 402 requesting information from a data table 420, database server 402 may execute the logical structure 424*a* associated with table 420. The logical structure extracts the information contained in the table 420 without extracting the row identifiers in that table. Database server 402 may then execute the query from the application using the information extracted from the table 420 by logical structure 424. This helps to provide the application with the requested information from database 112 without providing the row identifiers to the application. Logical structure 424 may include any hardware, software, firmware, or combination thereof for extracting information from a table 420 or 422. In one embodiment, logical structure 424 creates a logical view of a table 420 or 422. In this document, the term "view" refers to a subset of information extracted from or otherwise retrieved from a table or other structure in database 112. In a particular embodiment, logical structure 424 includes a SQL database "CREATE VIEW" command.

In one embodiment, each data table 420 and/or state information table 422 may have a table name used by web servers 110 to access information in those tables 420 and 422. For example, a data table 420 may be named CUSTOMER_DATA. In one embodiment, web servers 110 may access the information contained in that data table 420 by communicating a query to database server 402 containing the name of the data table 420. For example, a web server 110 may retrieve the information in the CUSTOMER_DATA table 420 by issuing a query to database 112 containing the name CUSTOMER_DATA.

To facilitate the use of logical structures 424, the data tables 420 and/or state information tables 422 in data stores 404 may be renamed. For example, each table 420 or 422 may be renamed by adding a prefix, suffix, extension, or other suitable identifier to the name of the table 420 or 422. As a particular example, the CUSTOMER_DATA table 420 may be renamed to drv_CUSTOMER_DATA. In this embodiment, the logical structure 424 associated with a table 420 or 422 may create a logical view of that table, and the view may be given the original name of the table 420 or 422. For example, the logical structure 424 associated with the drv_CUSTOMER_DATA table 420 may create a logical view having the name CUSTOMER_DATA. As a particular example, if the drv_CUSTOMER_DATA table 420 has five columns of information and one column of row identifiers, logical structure 424 may extract the five columns of information from that table 420 and name the logical view CUSTOMER_DATA. In one embodiment, logical structure 424 may include an SQL command such as "CREATE VIEW CUSTOMER_DATA AS 1, 2, 3, 4, 5 FROM DRV_CUSTOMER_DATA." This creates a logical view of the drv_CUSTOMER_DATA table 420, which includes the five columns of information used by an application executed by web server 110.

When a user or an application attempts to access information in database 112, the user or application may be unaware that the tables 420 and 422 have been renamed. For example, an application may submit a query requesting information from the CUSTOMER_DATA table 420. When this occurs, database server 402 executes the logical structure 424 associated with the drv_CUSTOMER_DATA table, which extracts information from that table and generates a logical view having the name CUSTOMER_DATA. The logical view contains the information from the drv_CUSTOMER_DATA table without the row identifiers. Database server 402 may then execute the query using the logical view. This allows applications to use information from tables 420 and 422 without rewriting those applications to ignore the row identifiers.

Although FIG. 4 illustrates one example embodiment of a database 112, various changes may be made to database 112 without departing from the scope of the present invention. For example, any suitable number of processors 406, memories 408, and/or interfaces may be used in database server 402, and any number of data stores 404 may be used in database 112. Also, the functions of server 402 may be implemented using any hardware, software, firmware, or combination thereof. As a particular example, the database replication agent functions may be implemented by software instructions stored in any suitable device, such as a RAM, a ROM, an ASIC, or a FPGA.

FIG. 5 is a block diagram illustrating an example data table 420. In the illustrated embodiment, table 420 includes a data section 502 and row identifiers 504. Other embodiments of table 420 may be used without departing from the scope of the present invention. Data section 502 may include any suitable information. For example, data section 502 may include the names, addresses, and phone numbers of customers of a business using sites 101 to sell products. Data section 502 could also include the names, descriptions, and product numbers of the products sold by the business. Data section 502 could include any other suitable information in any suitable format. In one embodiment, data section 502 contains information in rows and columns.

Row identifiers 504 identify the rows of information in data section 502. In one embodiment, each row identifier 504 uniquely identifies a row in a database 112. Database server 402 may use row identifiers 504 to facilitate the replication of changes to the information in data stores 404. For example, a row identifier 504 may identify one row in a particular table 420. When a change is made to one or more entries in that row, the row identifier 504 and at least a portion of the row may be copied to a change table 418. Database replication agent 416 may then communicate the information in change table 418 to another database 112. The database replication agent 416 in the other database 112 may receive the information and modify a data store 404 in the other database 112. For example, if a row was added to a data table 420 in one database 112, the database replication agent 416 in the other database 112 may not find a matching row identifier 504 in the other database 112. This causes the database replication agent 416 in the other database 112 to add the new row to a table 420. If one or more entries in a row are modified in one database 112, the database replication agent 416 in the other database 112 may identify the row in a table 420 that has a matching row identifier 504 and then replicate the changes to the entries in the identified row.

Although FIG. 5 illustrates one example embodiment of a data table 420, various changes may be made to data table 420 without departing from the scope of the present invention. For example, while the information is illustrated as residing in a table structure, any other suitable data structures, compilations, or arrangements may be used to store the information contained in data table 420. Also, database 112 could use column identifiers or any other suitable identifiers to identify entries in table 420 in place of row identifiers 504.

FIG. 6 is a block diagram illustrating an example state information table 422. In the illustrated embodiment, table 422 includes one or more entries 602, each including a session identifier 604, state information 606, and a row identifier 608. Other embodiments of table 422 may be used without departing from the scope of the present invention.

Session identifier 604 identifies a communication session with a client 102. For example, each session with a client 102 may be identified by a unique session identifier 604, which allows database 112 to store information about that session in an appropriate entry 602. State information 606 represents information about the communication session with a client 102. State information 606 may include any suitable information, such as the applications a client 102 is using and information provided to a web server 110 by client 102. Row identifiers 608 identify the rows of information in table 422. In one embodiment, each row identifier 608 uniquely identifies an entry 602 in table 422.

As described above, database server 402 may use row identifiers 608 to facilitate the replication of changes to the information in data stores 404. For example, as the state information 606 is updated in table 422, database replication agent 416 may use row identifiers 608 to copy at least a portion of an entry 602 to a change table 416. This allows the information about communication sessions with clients 102 to be synchronized across multiple databases 112. If one site 101 fails in system 100, the clients 102 communicating with that site 101 may be redirected to a second site 101. Some or all of the information about communication sessions with those clients 102 may be stored in the database 112 in the second site 101, which enables to second site 101 to provide service to clients 102 with fewer interruptions. In another embodiment, web servers 110 may execute "state-less" applications in which state information is stored at a client 102. In this embodiment, state information table 422 may be omitted from database 112.

Although FIG. 6 illustrates one example embodiment of a state information table 422, various changes may be made to table 422 without departing from the scope of the present invention. For example, any other and/or additional information about the communication sessions may be stored in table 422. Also, while the information is illustrated as residing in a table structure, any other suitable data structures, compilations, or arrangements may be used to store the information contained in table 422. Further, database 112 could use column identifiers or any other suitable identifiers to identify the information in table 422 in place of row identifiers 608. In addition, although FIG. 6 illustrates state information 604 indexed by session identifier 602, other identifiers may be used to identify state information 604 without departing from the scope of the present invention.

For example, a "cookie" associated with a client 102 may be used to identify the state information 604 associated with that client 102.

FIG. 7 is a block diagram illustrating an example change table 418. In the illustrated embodiment, table 418 includes one or more entries 702. Each entry 702 may include at least one table entry 704, a row identifier 706, and a time stamp 708. Other embodiments of change table 418 may be used without departing from the scope of the present invention.

In one embodiment, a change made to the information in a database 112 is stored in change table 418 as an entry 702. In this embodiment, each entry 702 represents at least one change to information in database 112. Table entries 704 represent the entries in a table 420 or 422 that have been added, deleted, and/or modified. For example, in one embodiment, when at least one entry in a row in tables 420 or 422 is changed, the entire row is copied into an entry 702 in table 418. Any other suitable number of entries from a table 420 or 422 may be copied into an entry 702 in table 418 without departing from the scope of the present invention. For example, in another embodiment, only the changed entries in a table 420 or 422 are copied into an entry 702.

Row identifier 706 identifies the row associated with the table entries 704 contained in an entry 702. Time stamp 708 identifies the time when the table entry 704 was changed in database 112. Time stamp 708 could, for example, identify the date and time of the change or simply the time of the change.

In one aspect of operation, database replication agent 416 generates a new entry 702 in table 418 each time information in database 112 is added, deleted, or modified. For example, if a new row is added to a table 420 or 422, the entries in the new row may be stored in an entry 702 in table 418. Similarly, if one or more entries of a row in a table 420 or 422 are modified, the modified entries or the entire row may be copied to another entry 702 in table 418. If a row is deleted in a table 420 or 422, an entry 702 may be set to indicate that the row associated with entry 702 has been deleted. The row identifier associated with the row being added, modified, or deleted may be stored in table 418 as a row identifier 706 in entry 702. In addition, a time of the addition, modification, or deletion may be recorded in table 418 as a time stamp 708 in an entry 702. Database replication agent 416 may routinely communicate the information contained in change tables 418 to another database 112. The other database 112 may then replicate the changes, helping to ensure that the information stored in databases 112 remain consistent.

In one embodiment, database replication agent 416 uses the time stamp 708 of an entry 702 to resolve conflicting changes to the same information in databases 112. For example, a first client 102 may modify particular information in one database 112, while a second client 102 modifies the same information in another database 112. When the database replication agent 416 in each database receives the changes made to the information in the other database 112, database replication agent 416 may compare the received changes to the changes contained in change table 418. If the same information was modified in both databases 112, database replication agent 416 may use the time stamp 708 associated with each change to determine which change has priority. For example, database replication agent 416 could treat later changes as having priority over earlier changes, or changes made by a particular client 102 or user have priority over other clients 102 or users. Other suitable criteria for resolving conflicting database changes may be used without departing from the scope of the present invention.

In one embodiment, multiple entries 702 in change table 418 may represent modifications to information in the same row of a table 420 or 422. For example, one entry 702 in change table 418 may represent a modification to the first entry of a row in table 420, while a second entry 702 represents a modification to the last entry in the same row in table 420. Database replication agent 416 may or may not consolidate entries 702 associated with the same row in a table 420 or 422. For example, if two entries 702 represent changes to different information in the same row of a table 420 or 422, database replication agent 416 may combine those two entries 702. This produces a single entry 702 containing all of the modified information and the row identifier 706 associated with the modified row. If two entries 702 represent changes to the same information in a table 420 or 422, database replication agent 416 may use time stamp 708 or other suitable criteria to determine which entry 702 has a higher priority, and database replication agent 416 could delete the entry 702 having a lower priority.

Any suitable number of change tables 418 may be used in system 100 without departing from the scope of the present invention. For example, a change table 418 may be associated with each table 420 or 422 contained in a database 112. In this embodiment, each change table 418 would store changes made to the information in the table 420 or 422 associated with that change table 418. Different change tables 418 may also be used in system 100 based on the type of change made. For example, in one embodiment, one change table 418 may store changes involving the addition of a new row to a table 420 or 422, another change table 418 may store changes involving the deletion of a row from a table 420 or 422, and a third change table 418 may store modifications to existing information in a table 420 or 422. Other embodiments may be used without departing from the scope of the present invention.

Although FIG. 7 illustrates one example embodiment of a change table 418, various changes may be made to change table 418 without departing from the scope of the present invention. For example, although FIG. 7 illustrates each entry 702 containing a row of table entries 704, each entry 702 could be associated with any number of entries from a table 420 or 422. Also, other suitable identifiers, such as column identifiers, may be used in place of row identifier 706.

FIG. 8 is flow diagram illustrating an example method 800 for multi-site clustering in a network. Method 800 may, for example, be performed by domain name server 104, secondary domain name server 106, and/or any other suitable component of system 100. Although method 800 may be described as being performed by secondary domain name server 106, other components of system 100 may perform method 800 without department from the scope of the present invention. Also, secondary domain name server 106 may be described as determining the order of the network addresses communicated to a client 102 based on the availability of sites 101. Secondary domain name server 106 could use any other suitable criteria, such as the load placed on each site 101, the response time of each site 101, and the locality of client 102 to a site 101.

Secondary domain name server 106 receives a domain name at step 802. This may include, for example, secondary domain name server 106 receiving the domain name from a client 102 over network 114. Secondary domain name server 106 identifies at least a first network address and a second network address associated with the received domain name at step 804. This may include, for example, secondary domain name server 106 accessing network address information 212 in memory 204 and retrieving the network addresses associated with the domain name.

Secondary domain name server 106 determines the status of the network addresses associated with the received domain names at step 806. This may include, for example, secondary domain name server 106 receiving information from a load balancer 108 in a site 101 associated with secondary domain name server 106. The information received from load balancer 108 may identify the status of load balancer 108, web servers 110, and/or database 112 associated with that site 101. This may also include secondary domain name server 106 determining whether ping messages have been received from another secondary domain name server 106 associated with another site 101 in a given time period.

Based on the identified status of the various components of system 100, secondary domain name server determines which network addresses, if any, associated with the received domain name to communicate to a client 102. Secondary domain name server 106 determines whether both network addresses are available at step 808. The first network address may be available if the load balancer 108, at least one web server 110, and database 112 in a site 101 are available. The second network address may be available if the secondary domain name server 106 associated with another site 101 is available. If both network addresses are available, secondary domain name server 106 communicates the first network address followed by the second network address to client 102 at step 810. In one embodiment, each secondary domain name server 106 in system 100 directs all clients 102 to a single site 101 until that site 101 is no longer available. At that point, the secondary domain name servers 106 may direct clients 102 to another site 101. In the illustrated embodiment, each secondary domain name server 106 may direct clients 102 to the site 101 associated with the first network address. If and when that site 101 fails, secondary domain name servers 106 may direct clients 102 to the site 101 associated with the second network address. Other allocations of clients 102 to sites 101 may be used without departing from the scope of the present invention. For example, secondary domain name servers 106 may use a round-robin approach, directing half of clients 102 to one site 101 and half of clients 102 to another site 101.

If both network addresses are not available at step 808, secondary domain name server 106 determines if the first network address is available at step 812. If the first network address is available, secondary domain name server 106 communicates the first network address to client 102. In this situation, the second network address is unavailable, and secondary domain name server 106 need not communicate the second network address to client 102. If the first network address is unavailable at step 812, secondary domain name server 106 determines whether the second network address is available at step 816. If the second network address is available, secondary domain server 106 communicates the second network address to client 102 at step 818. In this situation, the first site 101 is unavailable, so secondary domain name server 106 need not communicate the first network addressed to client 102. If neither network address is available, secondary domain name server 106 need not communicate any network addresses to client 102. Secondary domain name server 106 could communicate an error message or any other suitable information to client 102, or secondary domain name server 106 may communicate no information to client 102.

Although FIG. 8 illustrates one example embodiment of a method 800 for multi-site clustering, various changes may be made to method 800 without departing from the scope of the present invention. For example, more than two network addresses may be associated with a domain name. Also, secondary domain name server 106 may direct clients 102 to the second network address first and then to the first network address when the second network address fails.

FIG. 9 is a flow diagram illustrating an example method 900 for determining the status of components of a network site 101. Method 900 may, for example, be used by a load balancer 108 in site 101. Other components of system 100 may perform method 900 without departing from the scope of the present invention.

Load balancer 108 pings web servers 110 at step 902. This may include, for example, load balancer 108 communicating messages to web servers 110 through web server interface 308. Load balancer 108 determines if web servers 110 respond to the pings at step 904. This may include, for example, load balancer 108 determining if a response message has been received from each web server 110 through web server interface 308. If at least one of the web servers 110 is operational, the operational web server 110 should respond to the ping message with a response message. If none of the web servers 110 are operational, load balancer 108 may not receive any response to the ping messages. Based on the presence or absence of response messages, load balancer 108 may determine the status of web servers 110. Load balancer 108 may make any suitable use of this information. For example, if no web servers 110 are available, load balancer 108 may inform secondary domain name server 106 that site 101 is unavailable. Load balancer 108 may communicate this information to secondary domain name server 106 at predetermined intervals, in response to a query from secondary domain name server 106, or at any other suitable time.

Load balancer 108 instructs one or more web servers 110 to initiate execution of a web page at step 906. This may include, for example, load balancer 108 communicating the instruction to web server 110 through web server interface 308. Load balancer 108 could instruct a single web server 110 or multiple web servers 110 to execute a web page, and each web server 110 could execute the same or a different web page. Load balancer 108 receives the executed web page at step 908. This may include, for example, load balancer 108 receiving the web page from web server 110 through web server interface 308. Load balancer 108 may receive one or more web pages from one or more web servers 110. Load balancer 108 determines if the received web page contains an anticipated or expected key word at step 910. For example, the web page executed by web server 110 could attempt to extract the name of the database server 402 serving database 112 in site 101. Load balancer 108 examines the web page received from web server 110 and determines if the web page contains the correct name of database server 402. If the web page contains the expected keyword or keywords, load balancer 108 may determine that web servers 110 have the ability to execute web pages and/or that database 112 is operational and able to provide information to web servers 110. If the web page does not contain the anticipated keywords, load balancer 108 may determine that site 101 is unavailable due to problems with web servers 110 and/or database 112.

Although FIG. 9 illustrates one example embodiment of a method 900 for determining the status of a site 101, various changes may be made to method 900 without departing from the scope of the present invention. For example, any suitable test may be used to determine whether web servers 110 and/or database 112 are available. Also, load balancer 108 may determine the status of database 112 before determining the status of web servers 110.

FIG. 10 is a flow diagram illustrating an example method 1000 for database replication in a network. While method 1000 is described as being performed by database replication agent 416, any other suitable component or components in database 112 and/or system 100 may perform method 1000 without departing from the scope of the present invention.

Database server 402 stores first changes made to the information in database 112 at step 1002. This may include, for example, database replication agent 416 storing the changes to the information in data stores 404 as entries 702 in change table 418. This may also include database replication agent 416 storing the row identifiers 706 associated with the rows in which the information was changed. This may further include database replication agent 416 storing a time stamp 708 identifying the time at which the information in data stores 404 was changed. Database replication agent 416 may use one or multiple change tables 418 to track the changes to the information in data stores 404. Database server 402 consolidates the first changes made to database 112 at step 1004. This may include, for example, database replication agent 416 combining entries 702 in change table 418 that represent changes to the same row of information in database 112. If two entries 702 represent changes to different information in the same row, database replication agent 416 may combine these changes into a single entry 702 in change table 418. If two entries 702 represent conflicting changes to the same information in a row, database replication agent 416 may use the time stamps 708 for those entries 702 and/or other suitable criteria to determine which entry 702 has priority, and database replication agent 416 may delete the entry 702 having lower priority. Database server 402 communicates the first changes to at least one other database 112 at step 1006. This may include, for example, database replication agent 416 communicating the changes contained in table 418 to another database server 402 through alternate database server interface 414.

Database server 402 receives second changes from another database 112 at step 1008. This may include, for example, database server 402 receiving changes made to the information in data stores 404 in another database 112 in system 100. Database server 402 determines if any of the first and second changes conflict at step 1010. This may include, for example, database replication agent 416 determining if the first and second changes modified the same information in the same row of a table 420 or 422. For example, one of the first changes in change table 418 may indicate that a client 102 deleted a row in a particular data table 420, while a second change received from another database 112 indicates that another client 102 modified the entries in that row.

If any of the first and second changes conflict, database server 402 resolves the conflict at step 1012. This may include, for example, database replication agent 416 using the time stamps 708 on the first and second changes to resolve the conflict. As particular examples, database replication agent 416 could give higher priority to the changes having the earliest time stamp 708, the latest time stamp 708, or any other suitable time stamp 708. Database replication agent 416 could also support a hierarchy of changes, where changes higher in the hierarchy have priority over changes that are lower in the hierarchy. For example, database replication agent 416 could give priority to a change that deletes a row in a table 420 or 422 over a change that modifies an entry in that row. Database server 402 may use any other suitable criteria for resolving conflicts between changes to information stored in databases 112.

Database server 402 replicates the second changes to the information stored in database 112 at step 1014. This may include, for example, database replication agent 416 reproducing the second changes to the information stored in data stores 404 of database 112.

Although FIG. 10 illustrates one example embodiment of a method 1000 for database replication, various changes may be made to method 1000 without departing from the scope of the present invention. For example, database server 402 need not consolidate the first changes at step 1004. Also, database server 402 may receive the second changes from another database 112 before communicating the first changes to the other database 112.

FIG. 11 is a flow diagram illustrating an example method 1100 for accessing information in a replicated database 112. Database server 402 receives a query at step 1102. This may include, for example, database server 402 receiving the query from a web server 1110 through web server interface 410. The query may represent any suitable query, such as a request to view information about a specific product, a specific customer, or all information in a table 420 or 422. Database server 402 creates a logical view of the information in table 420 or 422 at step 1104. This may include, for example, database server 402 executing a logical structure 424 associated with the table 420 or 422. The logical structure 424 may, for example, extract all information from a table 420 or 422 except for the row identifiers 504 or 608 contained in that table 420 or 422. Database server 402 executes the query using the logical view of table 420 or 422 at step 1106. This may include, for example, database server 402 extracting the information requested by the query from the logical view of table 420 or 422. Database server 402 returns the query results at step 1108. This may include, for example, database server 402 communicating the query results to the web server 110 that communicated the query to database server 402. This allows web server 110 to receive the requested information from database 112, while helping to ensure that the row identifiers contained in the tables 420 and 422 are not communicated to web server 110.

Although FIG. 11 illustrates one example of a method 1100 for accessing data in a replicated database 112, various changes may be made to method 1100 without departing from the scope of the present invention. For example, database server 402 may use any suitable logical structure 424 to create a logical view of a table 420 or 422. Also, while database server 402 is described as extracting information from a table 420 or 422, database server 402 may extract information from any suitable data structure, compilation, or arrangement.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A method for multi-site clustering in a network, comprising:
   receiving a domain name from a client at a first domain name server;
   identifying a first network address and a second network address associated with the domain name, the first network address associated with a first site that includes a load balancer coupled to a plurality of web servers, the second network address associated with a second site that includes a second domain name server;

determining whether the first site is available to serve the client;

determining whether the second site is available to serve the client;

communicating the first network address followed by the second network address to the client based at least partially on a determination that the first site and the second site are available; and communicating the second network address to the client based at least partially on a determination that the first site is not available.

2. The method of claim 1, wherein determining whether the first site is available comprises determining whether at least one of the web servers is available.

3. The method of claim 2, wherein determining whether at least one of the web servers is available comprises:

communicating a message to the web servers; and determining whether the web servers respond to the message.

4. The method of claim 1, wherein:

the web servers are coupled to a database; and determining whether the first site is available comprises determining whether the database is available.

5. The method of claim 4, wherein determining whether the database is available comprises:

instructing at least one of the web servers to execute a web page;

receiving the executed web page; and determining if the executed web page contains at least one expected keyword.

6. The method of claim 5, wherein the expected keyword comprises a name of a database server serving the database.

7. The method of claim 1, wherein determining whether the second site is available comprises determining whether the second domain name server is available.

8. The method of claim 7, wherein determining whether the second domain name server is available comprises determining if at least one message has been received at the first domain name server from the second domain name server during each of a plurality of time periods.

9. The method of claim 1, further comprising communicating the first network address to the client when the first site is available and the second site is not available.

10. The method of claim 1, wherein communicating the first network address followed by the second network address to the client is also based on at least one of a load placed on each of the first and second sites, a response time of each of the first and second sites, and a locality of the client to each of the first and second sites.

11. The method of claim 10, further comprising communicating the second network address followed by the first network address to the client based on the determination that the first site and the second site are available and at least one of the load placed on each of the first and second sites, the response time of each of the first and second sites, and the locality of the client to each of the first and second sites.

12. The method of claim 1, wherein: the first site includes a first database; and the second site includes a second database.

13. The method of claim 12, further comprising synchronizing information in the first and second databases.

14. The method of claim 13, wherein synchronizing the information in the first and second databases comprises:

making first changes to the information in the first database;

communicating the first changes to the second database;

receiving second changes from the second database; and replicating the second changes to the information in the first database.

15. The method of claim 14, wherein each first change comprises one of an addition of information to the first database, a modification to existing information in the first database, and a deletion of existing information from the first database.

16. The method of claim 14, further comprising storing the first changes in at least one change table.

17. The method of claim 16, wherein storing the first changes in at least one change table comprises storing at least a portion of a row of information from the first database, a row identifier, and a time stamp in the change table.

18. The method of claim 17, wherein storing at least a portion of a row of information from the first database in the change table comprises storing an entire row of information in the change table, the first change affecting at least one entry in the row.

19. The method of claim 14, further comprising consolidating the first changes that affect information in one row of information from the first database.

20. The method of claim 19, wherein consolidating the first changes comprises: combining first changes that affect different entries in the row; and deleting at least one of a plurality of first changes that affect one or more common entries in the row.

21. The method of claim 14, further comprising: determining if any of the second changes conflict with the first changes; and deleting one of the first and second changes that conflict.

22. The method of claim 1, wherein the web servers are operable to execute stateless applications.

23. The method of claim 1, wherein the client is operable to use the first network address until the first network address fails and then use the second network address.

24. A system for multi-site clustering in a network, comprising:

at least one computer readable medium; and logic encoded on the computer readable medium and operable when executed to:

receive a domain name from a client;

identify a first network address and a second network address associated with the domain name, the first network address associated with a first site that includes a load balancer coupled to a plurality of web servers, the second network address associated with a second site that includes a domain name server;

determine whether the first site is available to serve the client;

determine whether the second site is available to serve the client;

communicate the first network address followed by the second network address to the client based at least partially on a determination that the first site and the second site are available; and communicate the second network address to the client based at least partially on a determination that the first site is not available.

25. The system of claim 24, wherein the logic is operable to determine whether the first site is available by receiving an indication from the load balancer identifying whether at least one of the web servers is available.

26. The system of claim 25, wherein the load balancer is operable to determine whether at least one of the web servers is available by:
communicating a message to the web servers; and
determining whether the web servers respond to the message.

27. The system of claim 24, wherein:
the web servers are coupled to a database; and
the logic is operable to determine whether the first site is available by receiving an indication from the load balancer identifying whether the database is available.

28. The system of claim 27, wherein the load balancer is operable to determine whether the database is available by:
instructing at least one of the web servers to execute a web page;
receiving the executed web page; and
determining if the executed web page contains at least one expected keyword.

29. The system of claim 24, wherein the logic is operable to determine whether the second site is available by determining whether the domain name server is available.

30. The system of claim 29, wherein the logic is operable to determine whether the domain name server is available by determining if at least one message has been received from the domain name server during each of a plurality of time periods.

31. The system of claim 24, wherein the logic is further operable to communicate the first network address to the client when the first site is available and the second site is not available.

32. The system of claim 24, wherein the logic is operable to communicate the first network address followed by the second network address to the client based also on at least one of a load placed on each of the first and second sites, a response time of each of the first and second sites, and a locality of the client to each of the first and second sites.

33. The system of claim 32, wherein the logic is further operable to communicate the second network address followed by the first network address to the client based on the determination that the first site and the second site are available and at least one of the load placed on each of the first and second sites, the response time of each of the first and second sites, and the locality of the client to each of the first and second sites.

34. The system of claim 24, wherein the first site includes a first database and the second site includes a second database, the databases operable to synchronize information in the first and second databases.

35. The system of claim 34, wherein the first database is operable to synchronize the information by:
making first changes to the information in the first database;
storing the first changes in at least one change table;
communicating the first changes in the change table to the second database;
receiving second changes from the second database; and
replicating the second changes to the information in the first database.

36. The system of claim 35, wherein the first database is further operable to:
combine first changes that affect different entries in the row;
delete at least one of a plurality of first changes that affect one or more common entries in the row;
determine if any of the second changes conflict with the first changes; and delete one of the first and second changes that conflict.

37. The system of claim 24, wherein the web servers are operable to execute stateless applications.

38. The system of claim 24, wherein the client is operable to use the first network 20 address until the first network address fails and then use the second network address.

39. A system for multi-site clustering in a network, comprising:
a memory operable to store a first network address and a second network address associated with a domain name; and
at least one processor operable to:
receive the domain name from a client;
identify the first network address and the second network address associated with the domain name, the first network address associated with a first site that includes a load balancer coupled to a plurality of web servers, the second network address associated with a second site that includes a domain name server;
determine whether the first site is available to serve the client;
determine whether the second site is available to serve the client;
communicate the first network address followed by the second network address to the client based at least partially on a determination that the first site and the second site are available; and
communicate the second network address to the client based at least partially on a determination that the first site is not available.

40. The system of claim 39, wherein the processor is operable to determine whether the first site is available by receiving an indication from the load balancer identifying whether at least one of the web servers is available.

41. The system of claim 40, wherein the load balancer is operable to determine whether at least one of the web servers is available by:
communicating a message to the web servers; and
determining whether the web servers respond to the message.

42. The system of claim 39, wherein:
the web servers are coupled to a database; and
the processor is operable to determine whether the first site is available by receiving an indication from the load balancer identifying whether the database is available.

43. The system of claim 42, wherein the load balancer is operable to determine whether the database is available by:
instructing at least one of the web servers to execute a web page;
receiving the executed web page; and
determining if the executed web page contains at least one expected keyword.

44. The system of claim 39, wherein the processor is operable to determine whether the second site is available by determining whether the domain name server is available.

45. The system of claim 44, wherein the processor is operable to determine whether the domain name server is available by determining if at least one message has been received from the domain name server during each of a plurality of time periods.

46. The system of claim 39, wherein the processor is further operable to communicate the first network address to the client when the first site is available and the second site is not available.

47. The system of claim 39, wherein the processor is operable to communicate the first network address followed by the second network address to the client based also on at least one of a load placed on each of the first and second sites, a response time of each of the first and second sites, and a locality of the client to each of the first and second sites.

48. The system of claim 47, wherein the processor is further operable to communicate the second network address followed by the first network address to the client based on the determination that the first site and the second site are available and at least one of the load placed on each of the first and second sites, the response time of each of the first and second sites, and the locality of the client to each of the first and second sites.

49. The system of claim 39, wherein the first site includes a first database and the second site includes a second database, the databases operable to synchronize information in the first and second databases.

50. The system of claim 49, wherein the first database is operable to synchronize the information by:
    making first changes to the information in the first database;
    storing the first changes in at least one change table;
    communicating the first changes in the change table to the second database; receiving second changes from the second database; and
    replicating the second changes to the information in the first database.

51. The system of claim 50, wherein the first database is further operable to: combine first changes that affect different entries in the row;
    delete at least one of a plurality of first changes that affect one or more common entries in the row;
    determine if any of the second changes conflict with the first changes; and delete one of the first and second changes that conflict.

52. The system of claim 39, wherein the web servers are operable to execute stateless applications.

53. The system of claim 39, wherein the client is operable to use the first network address until the first network address fails and then use the second network address.

54. A method for multi-site clustering in a network, comprising:
    receiving a domain name from a client at a first domain name server;
    identifying a first network address and a second network address associated with the domain name, the first network address associated with a first site that includes a load balancer coupled to a plurality of web servers and a first database, at least one of the web servers operable to execute stateless applications, the second network address associated with a second site that includes a second domain name server and a second database;
    determining whether the first site is available to serve the client by:
        communicating a message to the web servers;
        determining whether the web servers respond to the message;
        instructing at least one of the web servers to execute a web page;
        receiving the executed web page; and
        determining if the executed web page contains at least one expected keyword;
    determining whether the second site is available to serve the client by determining if at least one message has been received at the first domain name server from the second domain name server during each of a plurality of time periods;
    communicating the first network address followed by the second network address to the client based on a determination that the first site and the second site are available and on at least one of a load placed on each of the first and second sites, a response time of each of the first and second sites, and a locality of the client to each of the first and second sites; and
    communicating the second network address to the client based at least partially on a determination that the first site is not available.

55. A system for multi-site clustering in a network, comprising:
    at least one computer readable medium; and
    logic encoded on the computer readable medium and operable when executed to:
        receive a domain name from a client;
        identify a first network address and a second network address associated with the domain name, the first network address associated with a first site that includes a load balancer coupled to a plurality of web servers and a first database, at least one of the web servers operable to execute stateless applications, the second network address associated with a second site that includes a domain name server and a second database;
        determine whether the first site is available to serve the client by:
            communicating a message to the web servers;
            determining whether the web servers respond to the message;
            instructing at least one of the web servers to execute a web page; receiving the executed web page; and
            determining if the executed web page contains at least one expected keyword;
        determine whether the second site is available to serve the client by determining if at least one message has been received from the domain name server during each of a plurality of time periods;
        communicate the first network address followed by the second network address to the client based on a determination that the first site and the second site are available and on at least one of a load placed on each of the first and second sites, a response time of each of the first and second sites, and a locality of the client to each of the first and second sites; and
        communicate the second network address to the client based at least partially on a determination that the first site is not available.

56. A system for multi-site clustering in a network, comprising:
    a memory operable to store a first network address and a second network address associated with a domain name; and
    at least one processor operable to:
        receive the domain name from a client;
        identify the first network address and the second network address associated with the domain name, the first network address associated with a first site that includes a load balancer coupled to a plurality of web servers and a first database, at least one of the web servers operable to execute stateless applications, the second network address associated with a second site that includes a domain name server and a second database; determine whether the first site is available to serve the client by:

communicating a message to the web servers;
determining whether the web servers respond to the message; instructing at least one of the web servers to execute a web page;
receiving the executed web page; and
determining if the executed web page contains at least one expected keyword;
determine whether the second site is available to serve the client by determining if at least one message has been received from the domain name server during each of a plurality of time periods;
communicate the first network address followed by the second network address to the client based on a determination that the first site and the second site are available and on at least one of a load placed on each of the first and second sites, a response time of each of the first and second sites, and a locality of the client to each of the first and second sites; and
communicate the second network address to the client based at least partially on a determination that the first site is not available.

* * * * *